United States Patent
Wang et al.

(10) Patent No.: US 6,790,431 B2
(45) Date of Patent: Sep. 14, 2004

(54) REACTOR FOR TEMPERATURE MODERATION

(75) Inventors: Daxiang Wang, Ponca City, OK (US); Bang Cheng Xu, Houston, TX (US); Yi Jiang, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 13 days.

(21) Appl. No.: 10/196,115

(22) Filed: Jul. 16, 2002

(65) Prior Publication Data

US 2004/0014826 A1 Jan. 22, 2004

(51) Int. Cl.[7] .............................................. C01B 3/26
(52) U.S. Cl. ...................... 423/651; 208/133; 208/142; 252/373; 518/703
(58) Field of Search ................................. 208/133, 142; 252/373; 423/651, 652; 518/703; 422/196, 197, 201, 211

(56) References Cited

U.S. PATENT DOCUMENTS 6,333,294 B1   12/2001   Chao et al. ................. 502/325

FOREIGN PATENT DOCUMENTS

WO    WO 96/32188    * 10/1996
WO    WO 01/28678       4/2001    ............ B01J/23/89

OTHER PUBLICATIONS

Gunardson, Harold, *Industrial Gases in Petrochemical Processing*, Ch. 2 "Synthesis Gas Manufacture", Marcel Dekker, Inc. Pub.(1998) (pp. 41–80).
Olaf Deutschmann et al., Natural Conversion in Monolithic Catalysts: Interaction of Chemical Reactions and Transport Phenomena, 6th Natural Gas Conversion Symposium (2001).
Redenius et al., Millisccond Catalytic Wall Reactors: I. Radiant Burner, AICHE Journal, pp. 1177–1184 (May 2001).
Joannides et al., "Development of a novel heat–integrated wall reactor for the partial oxidation of methane to synthesis gas", *Catalysis Today*, pp.71–81 (1998).
Andrzej Cybulski and Jacob A. Moulijn eds, *Structured Catalysts and Reactors*, pp. 179–208, 599–615 (1998).

* cited by examiner

*Primary Examiner*—Stanley S. Silverman
*Assistant Examiner*—Maribel Medina
(74) *Attorney, Agent, or Firm*—Conley Rose, P.C.

(57) ABSTRACT

Embodiments include methods and apparatus for arranging multiple reaction zones such that at least one hot spot in one of the reaction zones is moderated by a cooler spot in an adjacent reaction zone.

22 Claims, 5 Drawing Sheets

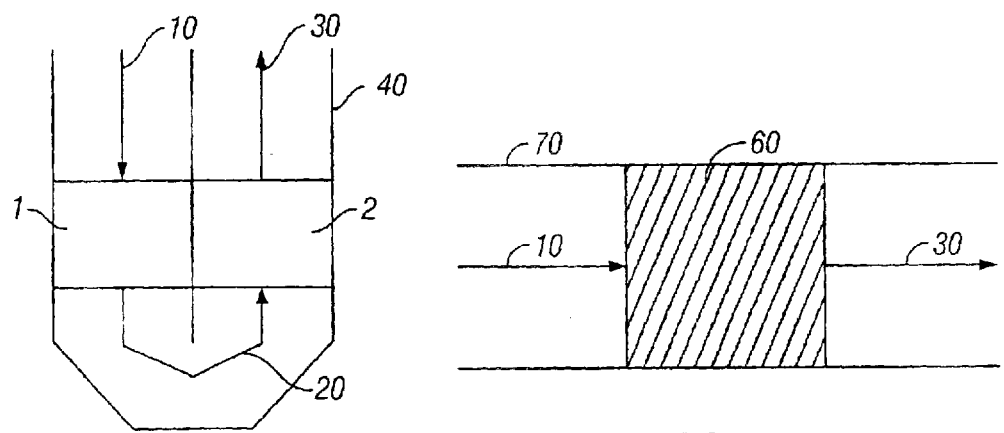
FIG. 2
FIG. 1
*(Prior Art)*
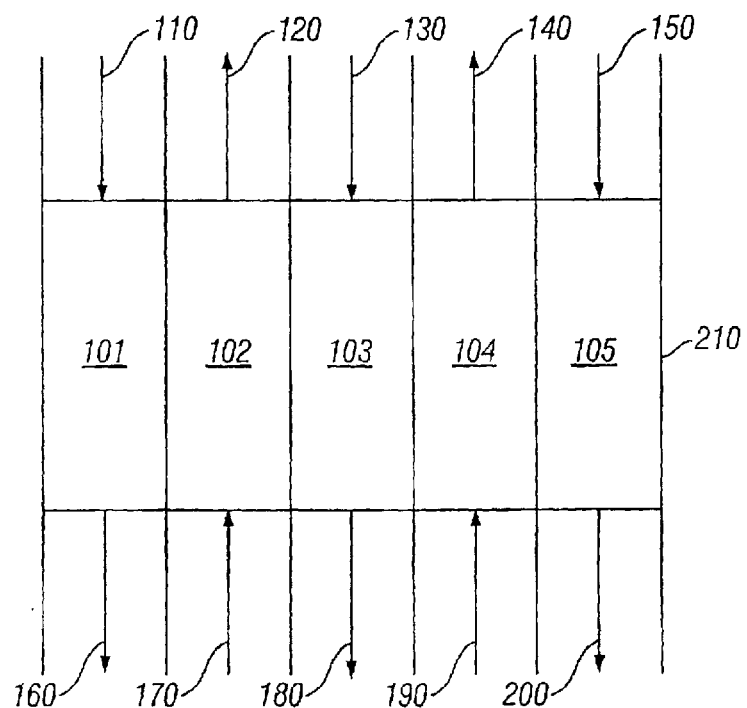
FIG. 3

T1 = independent temperature profile of reaction 550
T2 = independent temperature profile of reaction 560
T3 = combined temperature profile of reactions 550 and 560

REACTOR FOR TEMPERATURE MODERATION

REFERENCE TO RELATED APPLICATIONS

Not applicable.

STATEMENT REGARDING FEDERALLY SPONSORED RESEARCH

Not applicable.

TECHNICAL FIELD OF THE INVENTION

The present invention relates to a plurality of chemical reactors arranged to moderate the intensity of a hot spot in at least one of the reactors.

BACKGROUND OF THE INVENTION

Large quantities of natural gas are available in many areas of the world, and natural gas is predicted to outlast oil reserves by a significant margin. However, a significant amount of natural gas is situated in areas that are geographically remote from population and industrial centers. The costs of compression, transportation, and storage make its use economically unattractive. To improve the economics of natural gas use, much research has focused on the use of methane, the main component of natural gas, as a starting material for the production of higher hydrocarbons and hydrocarbon liquids, which are more easily transported and thus more economical. The conversion of methane to higher hydrocarbons is typically carried out in two steps. In the first step, methane is converted into a mixture of carbon monoxide and hydrogen (i.e., synthesis gas or syngas). In a second step, the syngas is converted into the higher hydrocarbons.

Current industrial use of methane or natural gas as a chemical feedstock proceeds by the initial conversion of the feedstock to carbon monoxide and hydrogen by either steam reforming (the most widespread process), dry reforming, autothermal reforming, or catalytic partial oxidation. Examples of these processes are disclosed in GUNARDSON, HAROLD, *Industrial Gases in Petrochemical Processing* 41–80 (1998), incorporated herein by reference. Steam reforming, dry reforming, and catalytic partial oxidation proceed according to the following reactions respectively:

$$CH_4+H_2O \rightleftharpoons CO+3H_2 \qquad (1)$$

$$CH_4+CO_2 \rightleftharpoons 2CO+2H_2 \qquad (2)$$

$$CH_4+\tfrac{1}{2}O_2 \rightarrow CO+2H_2 \qquad (3)$$

Catalytic partial oxidation (CPOX) has recently attracted much attention due to significant inherent advantages, such as the fact that heat is released during the process, in contrast to the endothermic steam and dry reforming processes.

In catalytic partial oxidation, a hydrocarbon feedstock is mixed with an oxygen source, such as air, oxygen-enriched air, or oxygen, and introduced to a catalyst at elevated temperature and pressure. When the feedstock comprises primarily methane (e.g., natural gas), the approximately 2:1 $H_2$:CO molar ratio achieved by partial oxidation is generally more useful than the $H_2$:CO ratio from steam reforming for the downstream conversion of the syngas to chemicals such as methanol and to fuels. Furthermore, oxidation reactions are typically much faster than reforming reactions. This allows the use of much smaller reactors for catalytic partial oxidation processes. The syngas in turn may be converted to hydrocarbon products, for example, fuels boiling in the middle distillate range, such as kerosene and diesel fuel, and hydrocarbon waxes by processes such as the Fischer-Tropsch synthesis. An example of a Fischer-Tropsch process is disclosed in U.S. Pat. No. 6,333,294 to Chao et al., incorporated herein by reference.

Unfortunately, the heat production during a CPOX reaction can be a double-edged sword. In a CPOX reactor, in addition to the desirable selective partial oxidation reaction, there often occurs a substantial amount of undesirable reactions such as the non-selective oxidation of methane (e.g. to products other than CO and $H_2$, for example, C, $CO_2$ and $H_2O$). Non-selective oxidation is much more exothermic than the desirable selective CPOX reaction ($CH_4+\tfrac{1}{2}O_2 \rightarrow CO+2H_2$) and, therefore, produces much more heat. This heat produced by the desirable partial oxidation reactions and the undesirable non-selective reactions can sometimes have undesirable consequences.

DEUTSCHMANN ET AL., *Natural Gas Conversion In Monolithic Catalysts: Interaction Of Chemical Reactions And Transport Phenomena*, 6th National Gas Conversion Symposium, Girdwood, USA (2001), incorporated herein by reference, predicted that the hot spot in a monolithic syngas reactor, the catalyst surface temperature can be as high as 2000K. This hot spot can cause active phase transformation and/or sinter the catalyst, causing a loss of surface area and, consequently, a loss of catalytic activity. This loss of catalytic activity can, in turn, lead to an increase in the rate of non-selective reaction, causing faster heat liberation and an even quicker deactivation of the catalyst, thus perpetuating a spiral of deactivation. Thus, there is a desire to limit the presence of and moderate the intensity of hot spots in the reaction zone.

An example of a single pass reactor is shown schematically in FIG. 2. It includes reactor 70, feedstream 10, reaction zone 60, and product stream 30. Feedstream 10 enters reactor 70 and reacts in reaction zone 60 to form product stream 30. Preferably, reactor 70 is a syngas reactor. Accordingly, feedstream 10 preferably comprises an oxygen-containing gas such as air, oxygen-enriched air, or substantially pure oxygen, and a hydrocarbon-containing gas such as methane or natural gas. Feedstream 10 is preheated and passed through reaction zone 60. Reaction zone 60 preferably comprises a supported catalyst comprising rhodium. The feedstream 10 reacts to form product stream 30 which comprises synthesis gas. It is often observed that the temperature profile in, for example, a single pass catalytic partial oxidation reactor such as the reactor of FIG. 2, an example of which is shown in the graph of FIG. 6, has a temperature spike in the front half of the reaction zone followed by a drop in temperature in the second half of the reaction zone.

As is shown in FIG. 1 prior attempts to solve the problem of hot spots in the reaction zone have led to reactor designs, such as reactor 40, in which feed stream 10 enters reactor zone 1 where it reacts exothermically to produce intermediate stream 20, is redirected to reactor zone 2 where it reacts more mildly, and exits reactor zone 2 as product stream 30. The extreme temperatures of the front of the reactor zone 1 are moderated by the lower temperature of the same flow stream at the rear of the reactor zone 2. Other examples of reactors in which the flow is folded in on itself is shown in FIG. 3 of REDENIUS ET AL., *Millisecond Catalytic Wall Reactors: I. Radiant Burner*, AICHE Journal (May 2001) and FIG. 1 of IOANNIDES AND VERYKIOS, *Develop-* ment of a Novel Heat-Integrated Wall Reactor for the Partial Oxidation of Methane to Synthesis Gas*, Catalysis Today (1998), both references incorporated herein by reference in their entirety. FIG. 3 of REDENIUS shows a reactor configured such that the reactor spirals around itself. FIG. 1 of IOANNIDES teaches a reactor in which the reactor doubles back against itself and an exothermic combustion catalyst is positioned adjacent an endothermic reforming catalyst, thus causing heat to transfer from the exothermic reaction zone to the endothermic reaction zone. With reference to FIG. 1, these types of configurations are disadvantageous because (1) all of the gas passing over reaction zone 1 must pass over reaction zone 2, thus making it impossible to vary the flow over both zones independently and (2) there is a gap between the two reaction zones 1 and 2 where the intermediate gas stream 20 may react non-selectively due to the absence of a catalyst to catalyze the preferred selective reactions. As noted above, the undesirable non-selective oxidation reactions produce more heat than the desired selective oxidation, thus this area of non-selective reaction will not only decrease the yield of the desired products, but also undesirably increase the amount of heat liberation.

SUMMARY OF THE PREFERRED EMBODIMENTS

Embodiments of the present invention run chemical reactions in adjacent reactors to ameliorate and reduce the effects of the hot spots generated by the reactions. Additionally, it is often the case that the present invention will advantageously decrease the rate of catalyst deactivation and increase catalyst life.

In a preferred embodiment of the present invention a chemical reactor which has a temperature spike in the first half and an area of milder temperature in the second half of the reactor, such as a partial oxidation syngas reactor, is arranged in an adjacent counterflow configuration with at least one substantially identical reactor. Thus, the temperature profiles of both reactors are moderated.

Other embodiments include running at least two partial oxidation reactors which are arranged in a manner such that the sharp spike in the temperature (i.e., the hot spot in the front of the reaction zone) of one reactor is greatly reduced and moderated by heat transfer to a cooler area in an adjacent reactor. Thus, many of the problems associated with the hot spot (e.g., catalyst deactivation) are greatly reduced, leading to longer catalyst life or higher average catalyst activity or both.

The temperature profile of two individual reactors and two reactors in accordance with an embodiment of the present invention is illustrated in FIG. 7. FIG. 7 shows individual temperature profiles ($T_{s1}$ and $T_{s2}$) of the reaction zones of two adjacent adiabatic counterflow reactors if there is no cross reactor heat exchange, and the combined temperature profile ($T_{sc}$) of the two counterflow reactors if heat transfer occurs between the two reactors. It should be noted that the height of the spikes in the temperature in the combined profile ($T_{sc}$) is much lower.

In another embodiment, at least two reactors are arranged in an adjacent counterflow configuration and the reaction zones of the two reactors are offset such that the hot spot of one reactor is moderated by a lower temperature in the other reactor.

In yet another embodiment, at least one reactor housing an exothermic reaction and at least one reactor housing an endothermic reaction are arranged adjacent to each other such that heat is exchanged between the two reactors and the heat of the exothermic reaction is moderated by the cooler endothermic reaction.

In another embodiment two cocurrent reactors are arranged such that the hot spot of one reactor is moderated by a cooler spot in the other reactor.

BRIEF DESCRIPTION OF THE DRAWINGS

FIG. 1 is a schematic drawing of an embodiment of a reactor of the prior art.

FIG. 2 is a schematic drawing of an individual single-pass reactor.

FIG. 3 is a first cross-sectional schematic drawing of a plurality of reaction zones in accordance with an embodiment of the present invention.

DETAILED DESCRIPTION OF THE PREFERRED EMBODIMENTS

Figure 6:
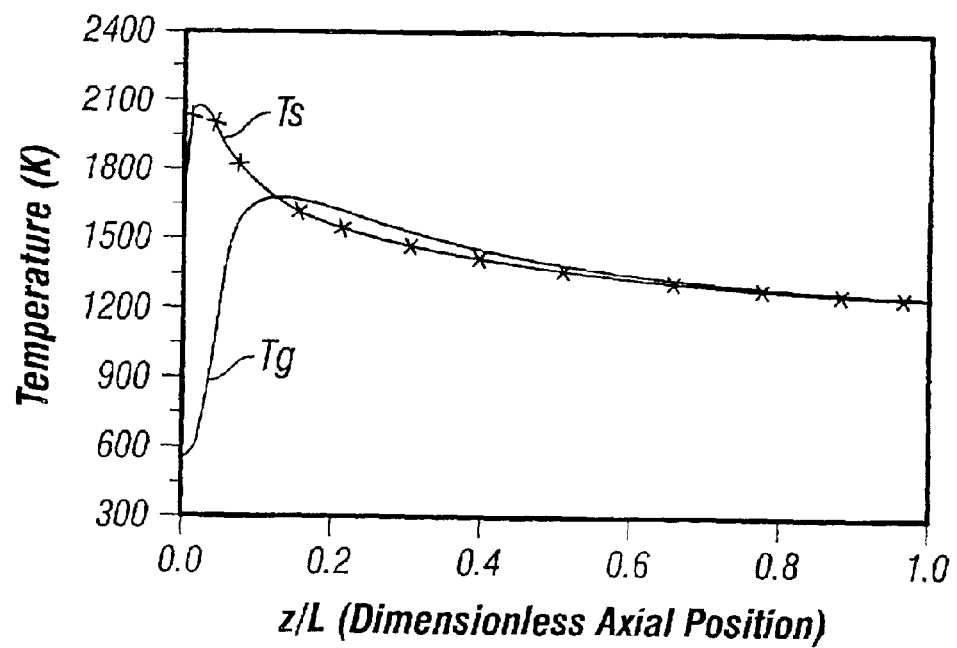
FIG. 6 is a graph of the gas phase temperature profile ($T_g$) and the catalyst surface temperature profile ($T_s$) of the reaction zone of an individual conventional single pass adiabatic reactor such as that of FIG. 2.

Referring now to the embodiment of FIG. 3, there is shown a reactor system 210 in which a plurality of individual catalytic partial oxidation reactors 101, 102, 103, 104, and 105 are placed adjacent to each other. Individual feed streams 110, 170, 130, 190, and 150 are fed into the reaction zones of reactors 101, 102, 103, 104, and 105 respectively. The feed streams then react in the respective reaction zones and exit as respective product streams 160, 120, 180, 140, and 200. As shown in the graph of FIG. 6, an individual reaction zone such as each individual reaction zone in FIG. 3, if allowed to react independently would be expected to have a temperature profile with a spike near the front of the reaction zone, and more moderate temperatures at the rear of the reaction zone.

It is to be understood that the embodiment of FIG. 3 is merely a schematic embodiment. In operation, the arrangement of the individual reaction zones may be in any manner as would be considered advantageous by one of ordinary skill in the art. For example, the individual reactor zones may be a plurality of individual reaction tubes arranged in a larger tube or a series of substantially concentric reactors or a combination of approaches.

In a preferred embodiment, during the respective reactions, heat is allowed to transfer between the adjacent individual partial oxidation reactors thus moderating the hot spots near the front of each reaction zone and creating a more even temperature profile for each reaction zone. This moderation is shown in the graphs of FIGS. 7 and 8.

Figure 7:
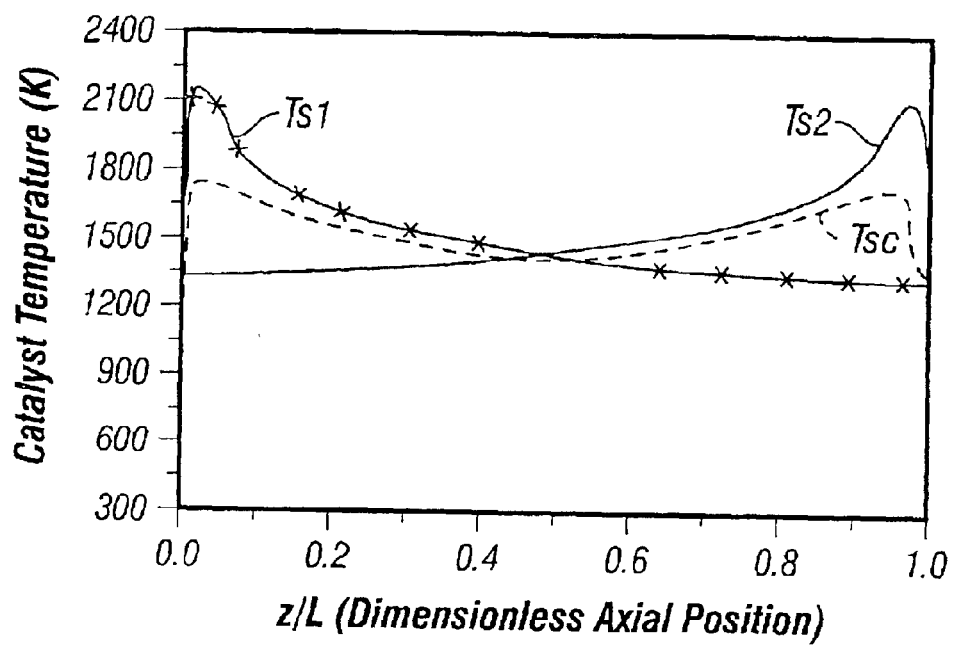
FIG. 7 is a graph of the axial catalyst surface temperature profiles of the reaction zones of two single pass reactors (flowing in opposite upflow and downflow directions) individually and combined in an adiabatic adjacent counterflow configuration.

FIG. 7 shows the individual catalyst surface temperature profiles ($T_{s1}$ and $T_{s2}$) of the reaction zones of two counterflow single pass reactors. As can be readily seen, the reactant flow in the first reaction zone ($T_{s1}$) is from left to right, with a temperature spike (up to about 2100K) near the very front of the reaction zone. Likewise, the second reaction zone ($T_{s2}$) has an identical temperature profile, except that the reactants flow from right to left. When heat is allowed to transfer freely between the reaction zones, the temperature profiles ($T_{sc}$) of the catalyst surface in the reaction zones is much more moderate. As can be seen in FIG. 7, the temperature of the combined reaction system only spikes as high as about 1700K.

It is well known that chemical systems (e.g., chemical reactors) can often be very accurately modeled by complex modeling software. Accordingly, the graphs of temperature profiles shown in FIGS. 6, 7, and 8, were prepared based upon detailed models of the kinetics schemes and reaction mechanisms of syngas reactors employing a rhodium catalyst as shown in DEUTSCHMANN ET AL. The model was applied to a packed bed syngas reaction system having the following parameters: catalyst bed length=L; catalyst bed diameter=D; catalyst particle size=1.0 mm; feed temperature=573.15 K; superficial velocity=4.0 ft/s; operating pressure=125 psig; and feed $O_2/CH_4$ molar ratio=0.525.

Figure 8:
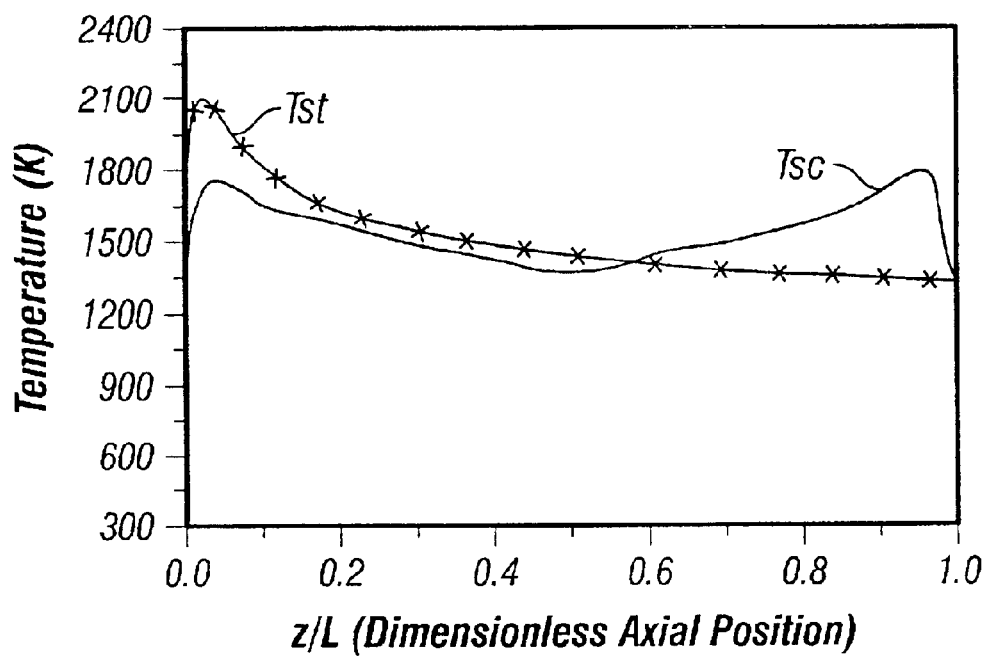
FIG. 8 is a graph of the axial surface temperature profiles of an adiabatic single-pass reactor individually ($T_{s1}$) and combined with a second identical reactor in an adjacent counterflow configuration ($T_{sc}$).

Although it is not shown in the figures, the mathematical modeling done to create the graphs of FIGS. 7 and 8 also predicted that by configuring the reactors such that there is heat transfer between the counterflow reaction zones (as opposed to an individual reactor, such as that of FIG. 2), methane conversion increases from 92% to 96%, hydrogen selectivity increases from 87% to 98%, and CO selectivity increases from 84% to 94%.

Figure 4:
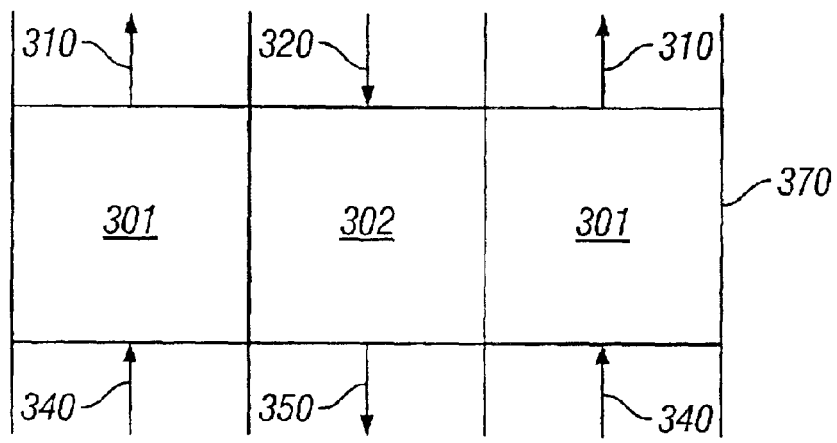
FIG. 4 is a second cross-sectional schematic drawing of a reactor in accordance with an embodiment of the present invention.
Figure 5:
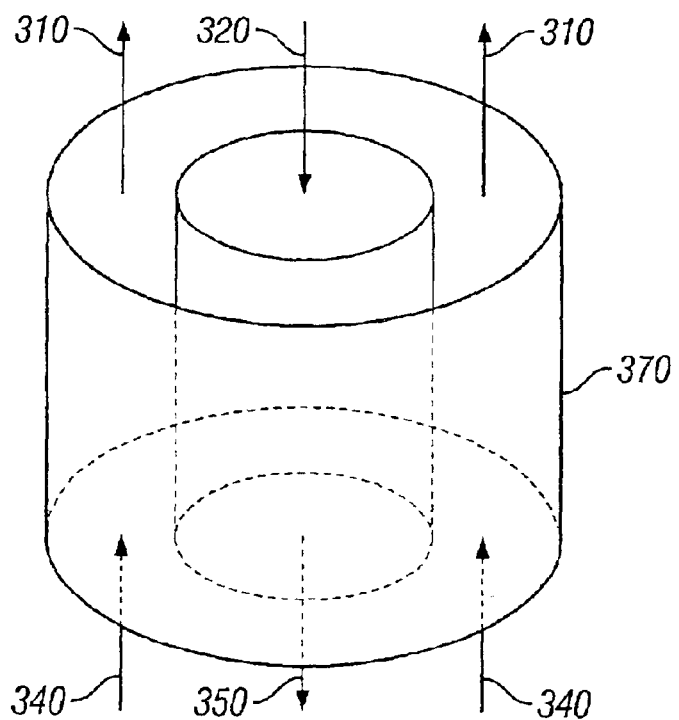
FIG. 5 is a schematic three-dimensional view of the reactor of FIG. 3.

Referring now to FIGS. 4 and 5, there is shown a reactor system 370 in which individual reactor 301 is disposed annularly around individual reactor 302. As indicated by the flow arrows, reactant stream 340 enters individual reactor 301 and reacts over the partial oxidation catalyst system in reactor 301 and exits reactor 301 as product stream 310. Likewise, feed stream 320 enters individual reactor 302 and reacts over the partial oxidation catalyst system in reactor 302 and exits reactor 302 as products stream 350. The heat transfer between the two adjacent reactors 301 and 302 causes a moderation of the temperature profile and substantially reduces the intensity of the hotspots in the individual reactors.

Figure 9:
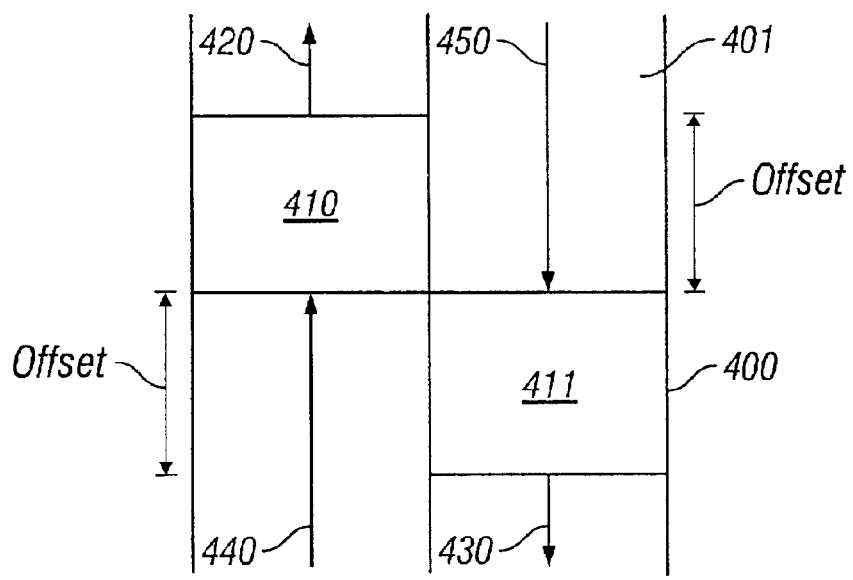
FIG. 9 is a schematic drawing of an offset reactor system in accordance with an embodiment of the present invention.

Referring now to FIG. 9, there is shown an offset reactor embodiment of the present invention. The two reactors 401 and 402 are arranged in an adjacent counterflow configuration. Reactant stream 440 enters reactor 402 and reaction zone 410, reacts in reaction zone 410 and exits reaction zone 410 as product stream 420. Likewise, reactant stream 450 enters reactor 401 and reaction zone 411 where it reacts to product stream 430. As can be seen, the reaction zones are not aligned as in the embodiments of FIGS. 3 and 4, but offset. The reaction zones of FIG. 9 are completely offset in that the reactor zones do not overlap. In the arrangement of FIG. 9, the reaction zones 410 and 411, and particularly the hot spots of reaction zones 410 and 411 are adjacent to the feed streams of the other reactor. Because the feed streams are cooler than the reaction zones and the product streams the heat transfer between the reaction zones 410 and 411 and the respective adjacent feed streams 450 and 440 will cause the temperature profile to be even more moderate. In addition, even less energy will need to be expended to preheat the feed stream in the reaction zones.

Figure 10:
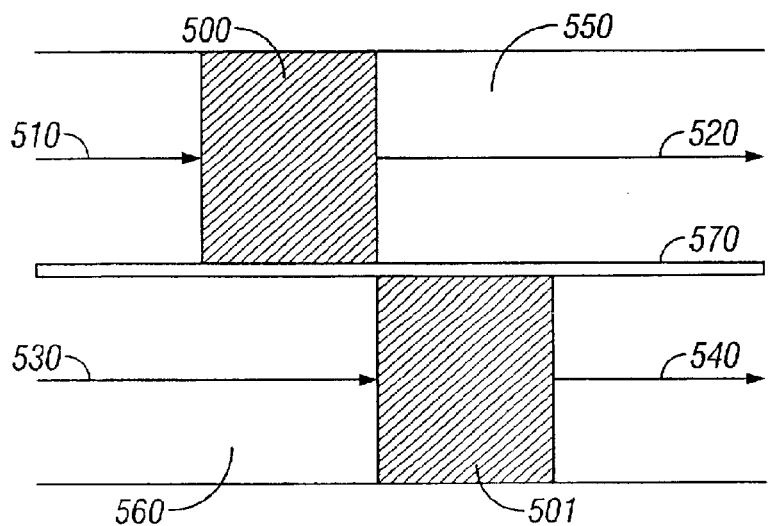
FIG. 10 is a schematic drawing of an offset cocurrent flow reactor system in accordance with an embodiment of the present invention.

Referring now to FIG. 10, there is shown a first reactor 550, a second reactor 560, a first feedstream 510, a second feedstream 530, a first reaction zone 500, a second reaction zone 501, a first product stream 520 and a second product stream 540.

First feedstream 510, preferably comprising methane (e.g., natural gas) and an oxygen-containing gas such as air, oxygen-enriched air, or substantially pure oxygen is fed into reactor 550 and through reaction zone 500 where at least a portion of it reacts to product stream 520 comprising synthesis gas. Reactor 560 preferably operates substantially similar to reactor 550 but is offset at least enough such that the hot spot of one reactor (e.g., reactor 550) is adjacent to a cooler spot in the other reactor (e.g., reactor 560). In FIG. 10, the two reaction zones are identical and offset by the entire length of the reaction zones. The optimum offset can be easily determined by one of ordinary skill in the art based upon actual reactor conditions (e.g., individual temperature profiles of the reactors).

Figure 11:
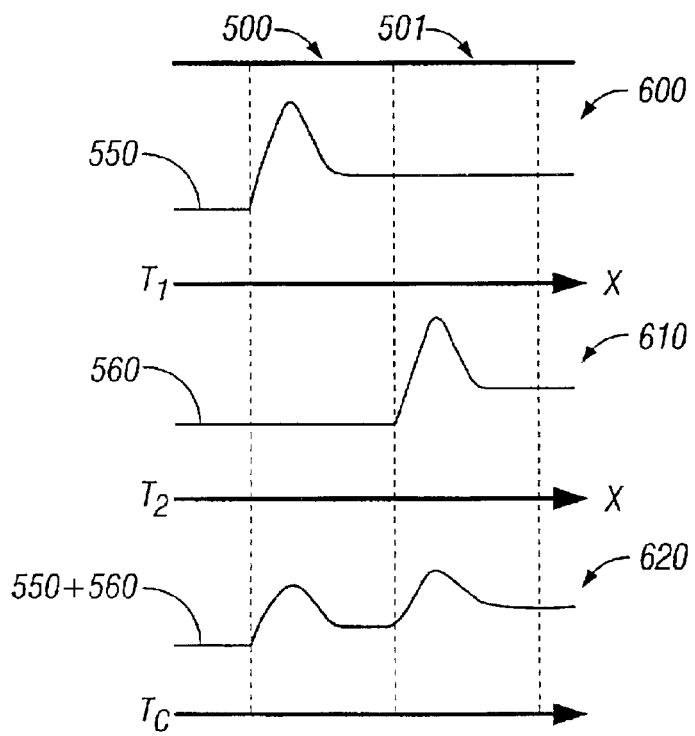
FIG. 11 is a series of stacked graphs showing qualitatively the temperature profiles of the reaction zones of the reactors of FIG. 10 individually and when combined.

The expected advantage of the reactor arrangement of FIG. 10 is illustrated in FIG. 11. Graph 600 of FIG. 11 shows qualitatively the individual independent temperature profile of reactor 550 of FIG. 10. Likewise, graph 610 of FIG. 11 shows qualitatively the individual independent temperature profile of reactor 560 of FIG. 10. Graph 620 of FIG. 11 shows qualitatively the expected temperature profile when heat is allowed to transfer between the two reactors 550 and 560 of FIG. 10. In each of graphs 600, 610, and 620, the x-axis represents distance into the reactor. The position of the beginning of reaction zone 500 is indicated by the left-most vertical dashed line. The end of reaction zone 500 and the beginning of reaction zone 501 is indicated by the center vertical dashed line. The end of reaction zone 501 is indicated by the right-most vertical dashed line. It can be easily seen that the combined temperature profile of graph 620 has lower temperature spikes (i.e., less severe conditions). Thus, it is expected that the catalyst will deactivate less quickly and the overall performance of the reactors will increase.

It will be understood by one of ordinary skill in the art that the present invention can include an exothermic reaction system (e.g., partial oxidation, hydrogenation, Fischer-Tropsch) in one reactor and an endothermic reaction system (e.g., dehydrogenation of paraffin to olefin, steam or/and dry reforming) in an adjacent reactor. The heat will be transferred from the exothermic reactor to the endothermic reactor and the spike in temperature (i.e., hot spot) occurring in the exothermic reaction zone will be reduced or moderated.

It will also be understood by one of ordinary skill in the art that the present invention encompasses not only partial oxidation reactor systems, but may also be employed to moderate the temperature profile of other reactor systems having individual reactors with independent temperature profiles similar to that of a partial oxidation reactor (i.e., a spike or hot spot in one portion of the reactor and a milder temperature profile in another portion of the reactor). The reactors need not carry-on the same type of reaction.

It also will be understood by one of ordinary skill in the art that it is not necessary that the reaction zones be of the same length. Additionally, in embodiments where the reaction zones in adjacent reactors are offset, it is not necessary that the reaction zones be offset by the length of the reaction zone as in FIG. 9 and FIG. 10. It may be desirable to have the adjacent reaction zones overlap or that they be even farther separated or that they be offset in the other direction (i.e., the reaction zone of one reactor is directly adjacent to the exit stream of the adjacent reactor).

The term "catalyst system" as used herein means any acceptable system for catalyzing the desired reaction in the reaction zone. By way of example only, a partial oxidation syngas catalyst system usually includes a support and a catalyst. The support may be, for example, particulates, pills, beads, granules, pellets, rings, monoliths, ceramic honeycomb structures, wire gauze, or any other suitable supports in any acceptable manufactured shape such as those listed herein. Additionally, multiple supports may be used; for example, one zone may contain one support and another zone may contain a different type or composition support. Suitable support materials include refractory materials such as zirconia, magnesium stabilized zirconia, zirconia stabilized alumina, yttrium stabilized zirconia, calcium stabilized zirconia, alumina, magnesium stabilized alumina, calcium stabilized alumina, cordierite, titania, silica, magnesia, niobia, ceria, vanadia, nitride, carbide, and combinations thereof. The partial oxidation catalyst may be selected from the group comprising nickel, samarium, rhodium, cobalt, platinum, Ni—MgO, Group VIII metals, combinations thereof, or any other catalysts mentioned herein or as is well known in the art. Like with the supports, multiple catalysts may be used; for example one zone may comprise one catalyst and another zone may comprise a second different catalyst. The above-exemplified examples of supports and catalysts are only examples. There are a plethora of catalysts systems known in the art which would be acceptable and are contemplated to fall within the scope, such as those disclosed in STRUCTURED CATALYSTS AND REACTORS 179–208, 599–615 (Andrzej Cybulski and Jacob A. Moulijn eds. 1998) and International Publication No. WO 01/28678 A1, both incorporated herein by reference for all purposes.

As used herein, two reactors are in an adjacent counterflow configuration when (1) they are arranged such that the overall reactant flow of the two reactors are substantially parallel, but flowing in substantially opposite directions and (2) the reactors are in close enough proximity that such that a substantial amount of heat transfer between the reactors occurs. A substantial amount of heat transfer occurs between two reactors when enough heat transfer occurs between the two reactors to effect the desired amount of temperature profile moderation. The greater the amount of heat transfer, the greater the amount of heat moderation. If no heat transfer occurs, the reactors each operate adiabatically, and the temperature profile of the reactors are not moderated at all (i.e., the intensity of hot spots are not moderated). Similarly, if perfect heat transfer occurs between the two reactors, the temperature is perfectly moderated and the temperature profile of the two reactors are identical. In reality, the moderation of the temperature profile will be somewhere between the two extremes. If a flatter temperature profile is desired, it is within the ability of one of ordinary skill in the art to configure the reactors such that adequate heat transfer occurs to create the desired temperature moderation. The reaction zones of two reactors in an adjacent counterflow configuration can be offset or non-offset. It is within the ability of one of ordinary skill in the art to determine whether or not to offset the reaction zones, and to what extent to offset the reaction zones.

As used herein, two reactors are in an adjacent cocurrent flow configuration when (1) they are arranged such that the overall reactant flow of the two reactors are substantially parallel, and flowing in substantially the same direction and (2) the reactors are in close enough proximity that such that a substantial amount of heat transfer between the reactors occurs. A substantial amount of heat transfer occurs between two reactors when enough heat transfer occurs between the two reactors to effect the desired amount of temperature profile moderation. The greater the amount of heat transfer, the greater the amount of heat moderation. If no heat transfer occurs, the reactors each operate adiabatically, and the temperature profile of the reactors are not moderated at all (i.e., the intensity of hot spots are not moderated). Similarly, if perfect heat transfer occurs between the two reactors, the temperature is perfectly moderated and the temperature profile of the two reactors are identical. In reality, the moderation of the temperature profile will be somewhere between the two extremes. If a flatter temperature profile is desired, it is within the ability of one of ordinary skill in the art to configure the reactors such that adequate heat transfer occurs to create the desired temperature moderation. The reaction zones of two reactors in an adjacent cocurrent flow configuration can be offset or non-offset. It is within the ability of one of ordinary skill in the art to determine whether or not to offset the reaction zones, and to what extent to offset the reaction zones.

Without further elaboration, it is believed that one skilled in the art can, using the description herein, utilize the present invention to its fullest extent. The embodiments herein are to be construed as illustrative, and not as constraining the disclosure in any way whatsoever.

What is claimed is:

1. A method for producing synthesis gas, the method computing:

providing a first reactor comprising a first partial oxidation syngas catalyst system, wherein the temperature profile of the first reactor comprises a first area of a first elevated temperature and a first area of a first moderate temperature which is lower than the first elevated temperature;

providing a second reactor comprising a second partial oxidation syngas catalyst system, wherein the temperature profile of the second reactor comprises a second area of a second elevated temperature and a second area of a second moderate temperature, wherein the second moderate temperature is lower than the first elevated temperature;

providing a first reactor comprising a hydrocarbon gas and an oxygen-containing gas, wherein the first feedstream is fed through the first reactor and the first reactor is operated at conditions effective to partially oxidize at least a portion of the hydrocarbon gas to a first product stream comprising synthesis gas;

providing a second feedstream comprising a hydrocarbon gas and an oxygen-containing gas, wherein the second feedstream is fed through the second reactor and the second reactor is operated at conditions effective to partially oxidize at least a portion of the hydrocarbon gas to a second product stream comprising synthesis gas;

arranging the first and second reactors such that the first area of a first elevated temperature exchanges heat with the second area of a second moderate temperature.

2. The method of claim 1 wherein the first moderate temperature is lower than the second elevated temperature and the second area of a second elevated temperature exchanges heat with the first area of a first moderate temperature.

3. The method of claim 1 wherein the reactors are arranged in an adjacent counterflow configuration.

4. The method of claim 1 wherein the reactors are arranged in an adjacent cocurrent configuration.

5. The method of claim 1 wherein the first reactor is disposed inside of the second reactor.

6. The method of claim 1 wherein at least one of the partial oxidation catalyst systems comprises at least one of nickel, samarium, rhodium, cobalt, platinum, Ni—MgO, or Group VIII metals.

7. The method of claim 6 wherein the partial oxidation catalyst system comprises a catalyst support selected from the group consisting of particulates, pills, beads, granules, pellets, rings, monoliths, ceramic honeycombs, and metal gauze.

8. The method of claim 7 wherein the catalyst support comprises substantially spherical granules with diameter of about 1 mm.

9. The method of claim 7 wherein the support comprises zirconia, magnesium stabilized zirconia, zirconia stabilized alumina, yttrium stabilized zirconia, calcium stabilized zirconia, alumina, magnesium stabilized alumina, calcium stabilized alumina, cordierite, titania, silica, magnesia, niobia, ceria, vanadia, nitride, carbide, or combinations thereof.

10. The method of claim 1 wherein the first and second reaction zones are offset.

11. The method of claim 1 wherein the first and second reaction zones are non-offset.

12. A method for producing a hydrocarbon liquid, the method comprising:
  providing a first reactor comprising a first partial oxidation syngas catalyst system, wherein the temperature profile of the first reactor comprises a first area of a first elevated temperature and a first area of a first moderate temperature which is lower than the first elevated temperature;
  providing a second reactor comprising a second partial oxidation syngas catalyst system, wherein the temperature profile of the second reactor comprises a second area of a second elevated temperature and a second area of a second moderate temperature which is lower than the first elevated temperature;
  providing a first feedstream comprising a hydrocarbon gas and an oxygen-containing gas, wherein the first feedstream is fed through the first reactor and the first reactor is operated at conditions effective to partially oxidize at least a portion of the hydrocarbon gas to a first product stream comprising synthesis gas;
  providing a second feedstream comprising a hydrocarbon gas and an oxygen-containing gas, wherein the second feedstream is fed through the second reactor and the second reactor is operated at conditions effective to partially oxidize at least a portion of the hydrocarbon gas to a second product stream comprising synthesis gas;
  arranging the first and second reactors such that the first area of a first elevated temperature exchanges heat with the second area of a second moderate temperature;
  contacting as least a portion of the synthesis gas with a catalyst so as to convert at least a portion of the synthesis gas to liquid hydrocarbons.

13. The method of claim 12 wherein the first moderate temperature is lower than the second elevated temperature and the second area of a second elevated temperature exchanges heat with the first area of a first moderate temperature.

14. The method of claim 12 wherein the reactors are arranged in an adjacent counterflow configuration.

15. The method of claim 12 wherein the reactors are arranged at an adjacent cocurrent configuration.

16. The method of claim 12 wherein the first reactor is disposed inside of the second reactor.

17. The method of claim 12 wherein at least one of the partial oxidation catalyst systems comprises at least one of nickel, samarium, rhodium, cobalt, platinum, Ni—MgO, or Group VIII metals.

18. The method of claim 17 wherein the partial oxidation catalyst system comprises a catalyst support selected from the group consisting of particulates, pills, beads, granules, pellets, rings, monoliths, ceramic honeycombs, and metal gauze.

19. The method of claim 18 wherein the catalyst support comprises substantially spherical granules with diameter of about 1 mm.

20. The method of claim 18 wherein the support comprises zirconia, magnesium stabilized zirconia, zirconia stabilized alumina, yttrium stabilized zisconia, calcium stabilized zirconia, alumina, magnesium stabilized alumina, calcium stabilized alumina, cordierite, titania, silica, magnesia, niobia, ceria, vanadia, nitride, carbide, or combinations thereof.

21. The method of claim 12 wherein the first and second reaction zones are offset.

22. The method of claim 12 wherein the first and second reaction zones are non-offset.

* * * * *

UNITED STATES PATENT AND TRADEMARK OFFICE
CERTIFICATE OF CORRECTION

| | |
|---|---|
| PATENT NO. | : 6,790,431 B2 |
| APPLICATION NO. | : 10/196115 |
| DATED | : September 14, 2004 |
| INVENTOR(S) | : Daxiang Wang et al. |

It is certified that error appears in the above-identified patent and that said Letters Patent is hereby corrected as shown below:

Column 8,
Line 49, "reactor" should be --feedstream--.

Signed and Sealed this

Twenty-fourth Day of April, 2007

JON W. DUDAS
*Director of the United States Patent and Trademark Office*